United States Patent
Reier et al.

(10) Patent No.: US 10,595,380 B2
(45) Date of Patent: Mar. 17, 2020

(54) LIGHTING WALL CONTROL WITH VIRTUAL ASSISTANT

(71) Applicant: IDEAL Industries Lighting LLC, Sycamore, IL (US)

(72) Inventors: Bart Reier, Cary, NC (US); David Power, Morrisville, NC (US); Yuan Fang, Durham, NC (US); Al Safarikas, Cary, NC (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 0 days.

(21) Appl. No.: 15/714,290

(22) Filed: Sep. 25, 2017

(65) Prior Publication Data

US 2018/0092189 A1   Mar. 29, 2018

Related U.S. Application Data

(60) Provisional application No. 62/400,525, filed on Sep. 27, 2016.

(51) Int. Cl.
*H05B 37/02* (2006.01)
*G10L 15/22* (2006.01)
(Continued)

(52) U.S. Cl.
CPC .......... *H05B 37/0236* (2013.01); *G10L 15/22* (2013.01); *G10L 15/265* (2013.01);
(Continued)

(58) Field of Classification Search
CPC ............ H05B 37/0227; H05B 37/0245; H05B 37/0272; H05B 37/0281
(Continued)

(56) References Cited

U.S. PATENT DOCUMENTS

D259,514 S   6/1981   Welch
D317,363 S   6/1991   Welch
(Continued)

FOREIGN PATENT DOCUMENTS

AT   492840 T   1/2011
AU   3666702 A   5/2002
(Continued)

OTHER PUBLICATIONS

Author Unknown, "Cluster Analysis", Wikipedia—the free encyclopedia, Updated May 21, 2013, Retrieved on May 30, 2013, http://en.wikipedia.org/wiki/cluster_analysis, 16 pages.
(Continued)

*Primary Examiner* — Tung X Le
(74) *Attorney, Agent, or Firm* — Withrow & Terranova, P.L.L.C.

(57) ABSTRACT

A lighting wall controller can be a retrofit for existing light switches, and the lighting wall control replaces the conventional light switch and can still work as a conventional light switch or other power switch with "dumb" lights or appliances while providing the ability to control "smart" lights and/or other "smart" devices with voice commands. In addition to controlling lights and/or devices, voice commands can be used to provide information or actions back to the user in response to the voice command. The lighting wall controller thereby provides voice control functionality without requiring additional devices, such as additional voice control appliances.

24 Claims, 11 Drawing Sheets

(51) Int. Cl.
*G10L 15/30* (2013.01)
*G10L 15/26* (2006.01)

(52) U.S. Cl.
CPC .......... *G10L 15/30* (2013.01); *H05B 37/0227* (2013.01); *H05B 37/0272* (2013.01); *G10L 2015/223* (2013.01); *Y02B 20/48* (2013.01)

(58) Field of Classification Search
USPC ................................................ 315/152, 312
See application file for complete search history.

(56) References Cited

U.S. PATENT DOCUMENTS

| | | |
|---|---|---|
| 5,079,680 A | 1/1992 | Kohn |
| D344,361 S | 2/1994 | Friedman et al. |
| D349,582 S | 8/1994 | Bain et al. |
| 5,471,119 A | 11/1995 | Ranganath et al. |
| D373,438 S | 9/1996 | McCann-Compton et al. |
| 6,100,643 A | 8/2000 | Nilssen |
| 6,118,230 A | 9/2000 | Fleischmann |
| 6,137,408 A | 10/2000 | Okada |
| 6,160,359 A | 12/2000 | Fleischmann |
| 6,166,496 A | 12/2000 | Lys et al. |
| 6,211,626 B1 | 4/2001 | Lys et al. |
| 6,437,692 B1 | 8/2002 | Petite et al. |
| 6,441,558 B1 | 8/2002 | Muthu et al. |
| 6,528,954 B1 | 3/2003 | Lys et al. |
| 6,553,218 B1 | 4/2003 | Boesjes |
| 6,735,630 B1 | 5/2004 | Gelvin et al. |
| 6,804,790 B2 | 10/2004 | Rhee et al. |
| 6,826,607 B1 | 11/2004 | Gelvin et al. |
| 6,832,251 B1 | 12/2004 | Gelvin et al. |
| 6,859,831 B1 | 2/2005 | Gelvin et al. |
| 6,914,893 B2 | 7/2005 | Petite |
| 6,975,851 B2 | 12/2005 | Boesjes |
| 6,990,394 B2 | 1/2006 | Pasternak |
| 7,009,348 B2 | 3/2006 | Mogilner et al. |
| 7,020,701 B1 | 3/2006 | Gelvin et al. |
| 7,031,920 B2 | 4/2006 | Dowling et al. |
| 7,103,511 B2 | 9/2006 | Petite |
| 7,139,562 B2 | 11/2006 | Matsui |
| 7,288,902 B1 | 10/2007 | Melanson |
| 7,305,467 B2 | 12/2007 | Kaiser et al. |
| 7,313,399 B2 | 12/2007 | Rhee et al. |
| D560,006 S | 1/2008 | Garner et al. |
| 7,344,279 B2 | 3/2008 | Mueller et al. |
| D565,771 S | 4/2008 | Garner et al. |
| D567,431 S | 4/2008 | Garner et al. |
| 7,391,297 B2 | 6/2008 | Cash et al. |
| 7,443,113 B2 | 10/2008 | Crouse et al. |
| D582,598 S | 12/2008 | Kramer et al. |
| 7,468,661 B2 | 12/2008 | Petite et al. |
| 7,482,567 B2 | 1/2009 | Hoelen et al. |
| 7,484,008 B1 | 1/2009 | Gelvin et al. |
| D586,950 S | 2/2009 | Garner et al. |
| D587,390 S | 2/2009 | Garner et al. |
| D588,064 S | 3/2009 | Garner et al. |
| 7,522,563 B2 | 4/2009 | Rhee |
| D594,576 S | 6/2009 | Chan et al. |
| 7,587,289 B1 | 9/2009 | Sivertsen |
| 7,606,572 B2 | 10/2009 | Rhee et al. |
| 7,638,743 B2 | 12/2009 | Bartol et al. |
| 7,649,456 B2 | 1/2010 | Wakefield et al. |
| 7,657,249 B2 | 2/2010 | Boesjes |
| 7,683,301 B2 | 3/2010 | Papamichael et al. |
| 7,697,492 B2 | 4/2010 | Petite |
| 7,797,367 B1 | 9/2010 | Gelvin et al. |
| 7,844,308 B2 | 11/2010 | Rhee et al. |
| 7,844,687 B1 | 11/2010 | Gelvin et al. |
| 7,868,562 B2 | 1/2011 | Salsbury et al. |
| 7,891,004 B1 | 2/2011 | Gelvin et al. |
| 7,904,569 B1 | 3/2011 | Gelvin et al. |
| 7,924,174 B1 | 4/2011 | Gananathan |
| 7,924,927 B1 | 4/2011 | Boesjes |
| 7,948,930 B2 | 5/2011 | Rhee |
| 8,011,794 B1 | 9/2011 | Sivertsen |
| 8,013,545 B2 | 9/2011 | Jonsson |
| 8,021,021 B2 | 9/2011 | Paolini |
| 8,035,320 B2 | 10/2011 | Sibert |
| 8,079,118 B2 | 12/2011 | Gelvin et al. |
| 8,098,615 B2 | 1/2012 | Rhee |
| 8,126,429 B2 | 2/2012 | Boesjes |
| 8,140,658 B1 | 3/2012 | Gelvin et al. |
| D663,048 S | 7/2012 | Chen |
| 8,228,163 B2 | 7/2012 | Cash |
| 8,271,058 B2 | 9/2012 | Rhee et al. |
| 8,274,928 B2 | 9/2012 | Dykema et al. |
| 8,275,471 B2 | 9/2012 | Huizenga et al. |
| 8,344,660 B2 | 1/2013 | Mohan et al. |
| 8,364,325 B2 | 1/2013 | Huizenga et al. |
| 8,425,071 B2 | 4/2013 | Ruud et al. |
| 8,461,781 B2 | 6/2013 | Schenk et al. |
| 8,466,626 B2 | 6/2013 | Null et al. |
| 8,497,634 B2 | 7/2013 | Scharf |
| 8,508,137 B2 | 8/2013 | Reed |
| 8,511,851 B2 | 8/2013 | Van de Ven et al. |
| 8,536,792 B1 | 9/2013 | Roosli |
| 8,536,984 B2 | 9/2013 | Benetz et al. |
| 8,564,215 B2 | 10/2013 | Okawa et al. |
| 8,591,062 B2 | 11/2013 | Hussell et al. |
| 8,596,819 B2 | 12/2013 | Negley et al. |
| 8,604,714 B2 | 12/2013 | Mohan et al. |
| 8,610,377 B2 | 12/2013 | Chemel et al. |
| 8,622,584 B2 | 1/2014 | Kinnune et al. |
| 8,626,318 B2 | 1/2014 | Wu |
| D703,841 S | 4/2014 | Feng et al. |
| D708,360 S | 7/2014 | Shibata et al. |
| 8,777,449 B2 | 7/2014 | Van De Ven et al. |
| 8,786,191 B2 | 7/2014 | Kuang et al. |
| 8,829,800 B2 | 9/2014 | Harris |
| 8,829,821 B2 | 9/2014 | Chobot et al. |
| 8,912,735 B2 | 12/2014 | Chobot et al. |
| 8,975,825 B2 | 3/2015 | Hu |
| 8,981,671 B2 | 3/2015 | Karasawa et al. |
| 9,028,087 B2 | 5/2015 | Wilcox et al. |
| 9,041,315 B2 | 5/2015 | Cho et al. |
| 9,155,165 B2 | 10/2015 | Chobot |
| 9,155,166 B2 | 10/2015 | Chobot |
| 9,182,096 B2 | 11/2015 | Kinnune et al. |
| D744,699 S | 12/2015 | Inoue et al. |
| 9,232,596 B2 | 1/2016 | Jelaca et al. |
| 9,326,358 B2 | 4/2016 | Campbell et al. |
| 9,332,619 B2 | 5/2016 | Olsen et al. |
| 9,351,381 B2 | 5/2016 | Verfuerth et al. |
| 9,408,268 B2 | 8/2016 | Recker et al. |
| 9,433,061 B2 | 8/2016 | Chobot |
| 9,504,133 B2 | 11/2016 | Verfuerth et al. |
| 9,538,617 B2 | 1/2017 | Rains, Jr. et al. |
| 9,572,226 B2 | 2/2017 | Motley et al. |
| 9,618,163 B2 | 4/2017 | Power et al. |
| 9,762,115 B2 | 9/2017 | Sharma |
| 2002/0047646 A1 | 4/2002 | Lys et al. |
| 2002/0195975 A1 | 12/2002 | Schanberger et al. |
| 2004/0001963 A1 | 1/2004 | Watanabe et al. |
| 2004/0002792 A1 | 1/2004 | Hoffknecht |
| 2004/0051467 A1 | 3/2004 | Balasubramaniam et al. |
| 2004/0193741 A1 | 9/2004 | Pereira et al. |
| 2004/0232851 A1 | 11/2004 | Roach, Jr. et al. |
| 2005/0127381 A1 | 6/2005 | Vitta et al. |
| 2005/0132080 A1 | 6/2005 | Rhee et al. |
| 2006/0022214 A1 | 2/2006 | Morgan et al. |
| 2006/0044152 A1 | 3/2006 | Wang |
| 2006/0066266 A1 | 3/2006 | Li Lim et al. |
| 2006/0076908 A1* | 4/2006 | Morgan ............ H05B 33/0842 315/312 |
| 2006/0125426 A1 | 6/2006 | Veskovic et al. |
| 2006/0161270 A1* | 7/2006 | Luskin .................. G05B 15/02 700/22 |
| 2006/0262545 A1 | 11/2006 | Piepgras et al. |
| 2007/0013557 A1 | 1/2007 | Wang et al. |
| 2007/0040512 A1 | 2/2007 | Jungwirth et al. |
| 2007/0085700 A1 | 4/2007 | Walters et al. |
| 2007/0126656 A1 | 6/2007 | Huang et al. |
| 2007/0132405 A1 | 6/2007 | Hillis et al. |

(56) References Cited

U.S. PATENT DOCUMENTS

| | | |
|---|---|---|
| 2007/0189000 A1 | 8/2007 | Papamichael et al. |
| 2007/0291483 A1 | 12/2007 | Lys |
| 2008/0031213 A1 | 2/2008 | Kaiser et al. |
| 2008/0088435 A1 | 4/2008 | Cash et al. |
| 2008/0197790 A1 | 8/2008 | Mangiaracina et al. |
| 2008/0218087 A1 | 9/2008 | Crouse et al. |
| 2008/0265799 A1 | 10/2008 | Sibert |
| 2009/0021955 A1 | 1/2009 | Kuang et al. |
| 2009/0026966 A1 | 1/2009 | Budde et al. |
| 2009/0184616 A1 | 7/2009 | Van De Ven et al. |
| 2009/0212718 A1 | 8/2009 | Kawashima et al. |
| 2009/0230894 A1 | 9/2009 | De Goederen et al. |
| 2009/0231832 A1 | 9/2009 | Zukauskas et al. |
| 2009/0237011 A1 | 9/2009 | Shah et al. |
| 2009/0267540 A1 | 10/2009 | Chemel et al. |
| 2009/0284169 A1 | 11/2009 | Valois |
| 2009/0284184 A1 | 11/2009 | Valois et al. |
| 2009/0302994 A1 | 12/2009 | Rhee et al. |
| 2009/0302996 A1 | 12/2009 | Rhee et al. |
| 2009/0305644 A1 | 12/2009 | Rhee et al. |
| 2009/0315485 A1 | 12/2009 | Verfuerth et al. |
| 2009/0315668 A1 | 12/2009 | Leete, III et al. |
| 2010/0007289 A1 | 1/2010 | Budike, Jr. |
| 2010/0013649 A1* | 1/2010 | Spira ............ G06F 3/041 340/664 |
| 2010/0084992 A1 | 4/2010 | Valois et al. |
| 2010/0128634 A1 | 5/2010 | Rhee et al. |
| 2010/0134051 A1 | 6/2010 | Huizenga et al. |
| 2010/0148940 A1 | 6/2010 | Gelvin et al. |
| 2010/0150122 A1 | 6/2010 | Berger et al. |
| 2010/0201516 A1 | 8/2010 | Gelvin et al. |
| 2010/0203515 A1 | 8/2010 | Rigler |
| 2010/0270935 A1 | 10/2010 | Otake et al. |
| 2010/0295473 A1 | 11/2010 | Chemel et al. |
| 2010/0301770 A1 | 12/2010 | Chemel et al. |
| 2010/0301773 A1 | 12/2010 | Chemel et al. |
| 2010/0301774 A1 | 12/2010 | Chemel et al. |
| 2010/0308664 A1 | 12/2010 | Face et al. |
| 2011/0025469 A1 | 2/2011 | Erdmann et al. |
| 2011/0031897 A1 | 2/2011 | Henig et al. |
| 2011/0035491 A1 | 2/2011 | Gelvin et al. |
| 2011/0057581 A1 | 3/2011 | Ashar et al. |
| 2011/0080120 A1 | 4/2011 | Talstra et al. |
| 2011/0095687 A1 | 4/2011 | Jonsson |
| 2011/0095709 A1 | 4/2011 | Diehl et al. |
| 2011/0101871 A1 | 5/2011 | Schenk et al. |
| 2011/0115407 A1 | 5/2011 | Wibben et al. |
| 2011/0133655 A1 | 6/2011 | Recker et al. |
| 2011/0137757 A1 | 6/2011 | Paolini et al. |
| 2011/0156596 A1 | 6/2011 | Salsbury |
| 2011/0178650 A1 | 7/2011 | Picco |
| 2011/0182065 A1 | 7/2011 | Negley et al. |
| 2011/0199004 A1 | 8/2011 | Henig et al. |
| 2011/0199020 A1 | 8/2011 | Henig et al. |
| 2011/0215725 A1 | 9/2011 | Paolini |
| 2011/0221350 A1 | 9/2011 | Staab |
| 2011/0249441 A1 | 10/2011 | Donegan |
| 2011/0254554 A1 | 10/2011 | Harbers |
| 2011/0298598 A1 | 12/2011 | Rhee |
| 2012/0007725 A1 | 1/2012 | Penisoara et al. |
| 2012/0013257 A1 | 1/2012 | Sibert |
| 2012/0026733 A1 | 2/2012 | Graeber et al. |
| 2012/0040606 A1 | 2/2012 | Verfuerth |
| 2012/0050535 A1 | 3/2012 | Densham et al. |
| 2012/0051041 A1 | 3/2012 | Edmond et al. |
| 2012/0079149 A1 | 3/2012 | Gelvin et al. |
| 2012/0082062 A1 | 4/2012 | Mccormack |
| 2012/0086345 A1 | 4/2012 | Tran |
| 2012/0087290 A1 | 4/2012 | Rhee et al. |
| 2012/0091915 A1 | 4/2012 | Ilyes et al. |
| 2012/0126705 A1 | 5/2012 | Pezzutti et al. |
| 2012/0130544 A1 | 5/2012 | Mohan et al. |
| 2012/0135692 A1 | 5/2012 | Feri et al. |
| 2012/0136485 A1 | 5/2012 | Weber et al. |
| 2012/0139426 A1 | 6/2012 | Ilyes et al. |
| 2012/0147604 A1 | 6/2012 | Farmer |
| 2012/0147808 A1 | 6/2012 | Rhee |
| 2012/0153840 A1 | 6/2012 | Dahlen et al. |
| 2012/0161643 A1 | 6/2012 | Henig et al. |
| 2012/0176041 A1 | 7/2012 | Birru |
| 2012/0206050 A1 | 8/2012 | Spero |
| 2012/0223657 A1 | 9/2012 | Van de Ven |
| 2012/0224457 A1 | 9/2012 | Kim et al. |
| 2012/0229048 A1 | 9/2012 | Archer |
| 2012/0230696 A1 | 9/2012 | Pederson et al. |
| 2012/0235579 A1 | 9/2012 | Chemel et al. |
| 2012/0235600 A1 | 9/2012 | Simonian et al. |
| 2012/0242242 A1 | 9/2012 | Linz et al. |
| 2012/0242254 A1 | 9/2012 | Kim et al. |
| 2012/0271477 A1 | 10/2012 | Okubo et al. |
| 2012/0280638 A1 | 11/2012 | Pereira et al. |
| 2012/0299485 A1 | 11/2012 | Mohan et al. |
| 2012/0306375 A1 | 12/2012 | van de Ven |
| 2012/0306377 A1 | 12/2012 | Igaki et al. |
| 2012/0320262 A1 | 12/2012 | Chung |
| 2012/0327650 A1 | 12/2012 | Lay et al. |
| 2013/0002157 A1 | 1/2013 | van de Ven et al. |
| 2013/0002167 A1 | 1/2013 | Van de Ven |
| 2013/0013091 A1 | 1/2013 | Cavalcanti et al. |
| 2013/0026953 A1 | 1/2013 | Woytowitz |
| 2013/0033872 A1 | 2/2013 | Randolph et al. |
| 2013/0049606 A1 | 2/2013 | Ferstl et al. |
| 2013/0051806 A1 | 2/2013 | Quilici et al. |
| 2013/0057395 A1 | 3/2013 | Ohashi |
| 2013/0058258 A1 | 3/2013 | Boesjes |
| 2013/0063042 A1 | 3/2013 | Bora et al. |
| 2013/0063047 A1 | 3/2013 | Veskovic |
| 2013/0069539 A1 | 3/2013 | So |
| 2013/0075484 A1 | 3/2013 | Rhee et al. |
| 2013/0077299 A1 | 3/2013 | Hussell et al. |
| 2013/0088168 A1 | 4/2013 | Mohan et al. |
| 2013/0093328 A1 | 4/2013 | Ivey et al. |
| 2013/0147366 A1 | 6/2013 | Huizenga et al. |
| 2013/0154831 A1 | 6/2013 | Gray et al. |
| 2013/0155392 A1 | 6/2013 | Barrilleaux et al. |
| 2013/0155672 A1 | 6/2013 | Vo et al. |
| 2013/0200805 A1 | 8/2013 | Scapa et al. |
| 2013/0221857 A1 | 8/2013 | Bowers |
| 2013/0229784 A1 | 9/2013 | Lessard et al. |
| 2013/0257292 A1 | 10/2013 | Verfuerth et al. |
| 2013/0257315 A1* | 10/2013 | Restrepo ............ H05B 37/0209 315/362 |
| 2013/0320862 A1 | 12/2013 | Campbell et al. |
| 2013/0328486 A1 | 12/2013 | Jones |
| 2013/0342911 A1 | 12/2013 | Bartol et al. |
| 2014/0001952 A1 | 1/2014 | Harris et al. |
| 2014/0001959 A1 | 1/2014 | Motley et al. |
| 2014/0001962 A1 | 1/2014 | Harris |
| 2014/0001963 A1 | 1/2014 | Chobot et al. |
| 2014/0001972 A1 | 1/2014 | Harris et al. |
| 2014/0001977 A1 | 1/2014 | Zacharchuk et al. |
| 2014/0062678 A1 | 3/2014 | de Clercq et al. |
| 2014/0070710 A1 | 3/2014 | Harris |
| 2014/0167621 A1 | 6/2014 | Trott et al. |
| 2014/0167646 A1 | 6/2014 | Zukauskas et al. |
| 2014/0212090 A1 | 7/2014 | Wilcox et al. |
| 2014/0232299 A1 | 8/2014 | Wang |
| 2014/0268790 A1 | 9/2014 | Chobot et al. |
| 2014/0312777 A1 | 10/2014 | Shearer et al. |
| 2014/0347885 A1 | 11/2014 | Wilcox et al. |
| 2014/0355302 A1 | 12/2014 | Wilcox et al. |
| 2015/0008827 A1 | 1/2015 | Carrigan et al. |
| 2015/0008828 A1 | 1/2015 | Carrigan et al. |
| 2015/0008829 A1 | 1/2015 | Lurie et al. |
| 2015/0008831 A1 | 1/2015 | Carrigan et al. |
| 2015/0015145 A1 | 1/2015 | Carrigan et al. |
| 2015/0022096 A1 | 1/2015 | Deixler |
| 2015/0042243 A1 | 2/2015 | Picard |
| 2015/0048758 A1 | 2/2015 | Carrigan et al. |
| 2015/0160673 A1 | 6/2015 | Vasylyev |
| 2015/0189724 A1* | 7/2015 | Karc ............ H05B 37/0272 315/149 |
| 2015/0195883 A1 | 7/2015 | Harris et al. |
| 2015/0253488 A1 | 9/2015 | Wilcox et al. |

(56) References Cited

U.S. PATENT DOCUMENTS

| | | | |
|---|---|---|---|
| 2015/0264780 | A1 | 9/2015 | Harris et al. |
| 2015/0345762 | A1 | 12/2015 | Creasman et al. |
| 2015/0351169 | A1 | 12/2015 | Pope et al. |
| 2015/0351187 | A1 | 12/2015 | McBryde et al. |
| 2015/0351191 | A1 | 12/2015 | Pope et al. |
| 2016/0029464 | A1 | 1/2016 | Hughes et al. |
| 2018/0109107 | A1* | 4/2018 | Mosebrook ............... H02J 3/14 |

FOREIGN PATENT DOCUMENTS

| | | |
|---|---|---|
| AU | 2002219810 A8 | 5/2002 |
| AU | 2002352922 A1 | 6/2003 |
| CA | 2426769 A1 | 5/2002 |
| CA | 2511368 A1 | 5/2002 |
| CN | 101461151 A | 6/2009 |
| CN | 102119507 A | 7/2011 |
| DE | 60143707 D1 | 2/2011 |
| EP | 1330699 A1 | 7/2003 |
| EP | 1334608 A2 | 8/2003 |
| EP | 1461907 A1 | 9/2004 |
| EP | 1719363 A2 | 11/2006 |
| EP | 1886415 A2 | 2/2008 |
| EP | 2304311 A1 | 4/2011 |
| EP | 2327184 A1 | 6/2011 |
| EP | 2440017 A2 | 4/2012 |
| HK | 1114508 | 10/2008 |
| IN | 4576/KOLNP/2007 | 7/2008 |
| JP | H11345690 A | 12/1999 |
| JP | 2001155870 A | 6/2001 |
| JP | 2003178889 A | 6/2003 |
| JP | 2005510956 A | 4/2005 |
| JP | 3860116 B2 | 12/2006 |
| JP | 3896573 B2 | 3/2007 |
| JP | 2010050069 A | 3/2010 |
| JP | 2010198877 A | 9/2010 |
| JP | 2011526414 A | 10/2011 |
| JP | 2012226993 A | 11/2012 |
| KR | 20060050614 A | 5/2006 |
| KR | 20080025095 A | 3/2008 |
| KR | 20110001782 A | 1/2011 |
| KR | 20110095510 A | 8/2011 |
| WO | 0126068 A1 | 4/2001 |
| WO | 0126327 A2 | 4/2001 |
| WO | 0126328 A2 | 4/2001 |
| WO | 0126329 A2 | 4/2001 |
| WO | 0126331 A2 | 4/2001 |
| WO | 0126332 A2 | 4/2001 |
| WO | 0126333 A2 | 4/2001 |
| WO | 0126334 A2 | 4/2001 |
| WO | 0126335 A2 | 4/2001 |
| WO | 0126338 A2 | 4/2001 |
| WO | 0239242 A1 | 5/2002 |
| WO | 0241604 A2 | 5/2002 |
| WO | 03047175 A1 | 6/2003 |
| WO | 2004109966 A2 | 12/2004 |
| WO | 2006095316 A1 | 9/2006 |
| WO | 2006130662 A2 | 12/2006 |
| WO | 2007102097 A1 | 9/2007 |
| WO | 2009011898 A2 | 1/2009 |
| WO | 2009076492 A1 | 6/2009 |
| WO | 2009145747 A1 | 12/2009 |
| WO | 2009151416 A1 | 12/2009 |
| WO | 2009158514 A1 | 12/2009 |
| WO | 2010010493 A2 | 1/2010 |
| WO | 2010047971 A2 | 4/2010 |
| WO | 2010122457 A2 | 10/2010 |
| WO | 2011070058 A2 | 6/2011 |
| WO | 2011087681 A1 | 7/2011 |
| WO | 2011090938 A1 | 7/2011 |
| WO | 2011152968 A1 | 12/2011 |
| WO | 2012112813 A2 | 8/2012 |
| WO | 2012125502 A2 | 9/2012 |
| WO | 2013050970 A1 | 4/2013 |
| WO | 2014120971 A1 | 8/2014 |

OTHER PUBLICATIONS

Author Unknown, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Data Terminal Equipment (DTE) Power via Media Dependent Interface (MDI)," Standard 802.3af-2003, Jun. 18, 2003, The Institute of Electrical and Electronics Engineers, Inc., 133 pages.

Author Unknown, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment 3: Data Terminal Equipment (DTE) Power via the Media Dependent Interface (MDI) Enhancements," Standard 802.3at-2009, Sep. 11, 2009, The Institute of Electrical and Electronics Engineers, Inc., 141 pages.

Author Unknown, "Multi-Agent System", Wikipedia—the free encyclopedia, Updated Apr. 18, 2013, Retrieved May 30, 2013, http://en.wikipedia.org/wiki/multi-agent_system, 7 pages.

Author Unknown, i2C-Bus: What's That?, Updated 2012, Retrieved May 30, 2013, http://www.i2c-bus.org, 1 page.

Kuhn, Fabian et al., "Initializing Newly Deployed Ad Hoc & Sensor Network", The Tenth Annual International Conference on Mobile Computing and Networking (MobiCom '04), Sep. 26-Oct. 4, 2004, 15 pages, Philadelphia, PA.

Teasdale, Dana et al., "Annual Technical Progress Report: Adapting Wireless Technology to Lighting Control and Environmental Sensing," Dust Networks, Aug. 1, 2004, 41 pages.

DiGeronimo, John, "Search Report," EIC 2800, Tracking No. 533769, Scientific & Technical Information Center, Feb. 1, 2017, 16 pages.

Author Unknown, "Controlling LEDs," Lutron Electronics Co., Inc., Jan. 1, 2011, 16 pages.

Author Unknown, "Section 16950: Distributed Digital Lighting Control System," Lighting Control Devices, Apr. 30, 2013, 20 pages.

Author Unknown, "System Design Guide—Lighting Control & Design: System Overview," Lighting Control and Design, Form No. 1382.057, Accessed Aug. 9, 2013, 4 pages.

Author Unknown, "System Overview & Introduction," nLight Network Lighting Controls, Accessed: Aug. 9, 2013, 4 pages, http://nlightcontrols.com/lighting-controls/overview.

Author Unknown, "The System: Components," Simply5, Accessed: Aug. 9, 2013, 2 pages, http://simply5.net/how.html.

Technical Publications Department at Creston, "Creston Green Light Commercial Lighting Design Guide," Creston Electronics, Inc., 2013, 74 pages.

Notice of Allowance for U.S. Appl. No. 15/628,975, dated Oct. 10, 2017, 9 pages.

U.S. Appl. No. 13/649,531, filed Oct. 11, 2012.
U.S. Appl. No. 13/589,899, filed Aug. 20, 2012.
U.S. Appl. No. 13/606,713, filed Sep. 7, 2012, now U.S. Pat. No. 8,829,800.
U.S. Appl. No. 13/782,022, filed Mar. 1, 2013.
U.S. Appl. No. 13/782,040, filed Mar. 1, 2013, now U.S. Pat. No. 8,975,827.
U.S. Appl. No. 13/782,053, filed Mar. 1, 2013.
U.S. Appl. No. 13/782,068, filed Mar. 1, 2013.
U.S. Appl. No. 13/782,078, filed Mar. 1, 2013, now U.S. Pat. No. 8,829,821
U.S. Appl. No. 13/782,096, filed Mar. 1, 2013.
U.S. Appl. No. 13/782,131, filed Mar. 1, 2013, now U.S. Pat. No. 8,912,735.
U.S. Appl. No. 29/452,813, filed Apr. 22, 2013.
U.S. Appl. No. 13/868,021, filed Apr. 22, 2013.
U.S. Appl. No. 13/719,786, filed Dec. 19, 2012.
U.S. Appl. No. 14/588,762, filed Feb. 1, 2015.
U.S. Appl. No. 14/498,119, filed Sep. 26, 2014.

(56) References Cited

OTHER PUBLICATIONS

U.S. Appl. No. 14/287,812, filed May 27, 2014.
U.S. Appl. No. 14/292,286, filed May 30, 2014.
U.S. Appl. No. 14/292,332, filed May 30, 2014.
U.S. Appl. No. 14/292,363, filed May 30, 2014.
U.S. Appl. No. 14/498,147, filed Sep. 26, 2014.
U.S. Appl. No. 14/498,168, filed Sep. 26, 2014.
U.S. Appl. No. 14/498,197, filed Sep. 26, 2014.
U.S. Appl. No. 14/498,219, filed Sep. 26, 2014.
U.S. Appl. No. 14/681,846, filed Apr. 8, 2015.
U.S. Appl. No. 15/628,975, filed Jun. 21, 2017.
Notice of Allowance for U.S. Appl. No. 15/628,975, dated Dec. 28, 2017, 8 pages.

* cited by examiner

LIGHTING WALL CONTROL WITH VIRTUAL ASSISTANT

RELATED APPLICATIONS

This application claims the benefit of provisional patent application Ser. No. 62/400,525, filed Sep. 27, 2016, the disclosure of which is hereby incorporated herein by reference in its entirety.

FIELD OF THE DISCLOSURE

The present disclosure relates to wall controls for lighting systems, and in particular to lighting wall controls including extended functionality such as a voice-directed virtual assistant.

BACKGROUND

Networked "smart home" devices continue to grow in popularity, providing increasing levels of functionality and convenience. For example, traditional light bulbs and lighting fixtures are increasingly being replaced with light-emitting diode (LED) based bulbs and fixtures, which may be networked together in order to provide features such as remote control from a smart phone and basic automation. In addition, devices such as door locks, thermostats, connected power outlets, and media remote controls are now being network connected to add features beyond what has previously been possible. Due to the large variety of these devices, there is now an emerging market for home automation "hubs", which are capable of communicating with a variety of these devices in order to provide a user with a single place to control all of their devices. While many of these home automation "hubs" accomplish this task, they are often discrete devices that must be separately added to a network. One type of home automation "hub" may provide voice control over one or more "smart home" devices. Referred to herein as a voice control appliance, these devices respond to voice commands by providing audible feedback or changing the settings of one or more "smart home" devices connected thereto. For example, the Amazon Echo is one such device that has gained popularity in recent years. While such devices may provide convenient "voice assistant" functionality, they are generally only capable of listening for voice commands in a relatively small space. That is, an installation may require several of these voice control appliances placed around a space in order to adequately hear voice commands issued by a user throughout the space. Providing voice control appliances in this manner may not only be unsightly, but may be impractical in some scenarios due to the fact that they generally require access to a power outlet which may not be available. Environmental obstructions may interfere with the ability of these voice control appliances to recognize voice commands due to the required placement of such a standalone device in a particular location.

Accordingly, there is a need for an improved way to communicate with networked "smart home" devices and distribute the control thereof within a space.

SUMMARY

The present disclosure relates to wall controls for lighting systems, and in particular to lighting wall controls including extended functionality such as a voice-directed virtual assistant. In one embodiment, a lighting wall controller can be a retrofit for existing light switches, and the lighting wall control replaces the conventional light switch and can still work as a conventional light switch or other power switch with "dumb" lights or appliances while providing the ability to control "smart" lights and/or other "smart" devices with voice commands. In addition to controlling lights and/or devices, voice commands can be used to provide information or actions back to the user in response to the voice command. The lighting wall controller thereby provides voice control functionality without requiring additional devices, such as additional voice control appliances.

In one embodiment, the lighting wall controller can include processing circuitry, a memory, and a user interface. The memory includes instructions, which, when executed by the processing circuitry cause the lighting wall controller to process a voice command received from a user via the user interface and perform one or more actions in response thereto.

In one embodiment, processing the voice command from the user includes transcribing the voice command and sending the transcribed voice command to a remote device. The remote device then determines one or more actions to be taken based on the transcribed voice command and sends the one or more actions back to the lighting wall controller. In response, the lighting wall controller executes the one or more actions.

In one embodiment, processing the voice command from the user includes sending the voice command or a processed version of the voice command to a remote device, where it is transcribed. The remote device then determines one or more actions to be taken based on the transcribed voice command and sends the one or more actions back to the wall controller. In response, the wall controller executes the one or more actions. For example, the user may want to know the answer to a question. The user can ask the question to the wall controller which sends the processed version of the voice command, (i.e., the question), to the remote device or voice control appliance, and the remote device or voice control appliance retrieves the answer to the question itself or through other devices. The remote device will send the answer to the question which will be transmitted to the user via a speaker, display or other user interface.

In one embodiment, the remote device is a device on the same local area network (LAN) as the lighting wall controller. There may be one or more intermediate devices through which the lighting wall controller communicates with the remote device over the LAN. In another embodiment, the remote device is a device located outside of the LAN of the lighting wall controller, for example, on a wide area network (WAN) to which the lighting wall controller connects to via a gateway. In one embodiment, the remote device is a voice control appliance. In another embodiment, the remote device is a server.

In one embodiment, processing the voice command from the user includes locally transcribing the voice command and determining one or more actions to be taken based on the transcribed voice command. In response, the lighting wall controller executes the one or more actions.

In some embodiments, the wall controllers form a network, such as a mesh network or partial (i.e., weak) mesh network, and transmit information or commands between each other. For example, a user in the master bedroom could send a command to turn off the lights in the kitchen. Depending on the embodiment, the voice command could go directly to the wall controller in the kitchen and the wall controller in the kitchen will turn off the lights, or the voice controller could go to a voice control appliance or other device which sends a command to the wall controller in the kitchen to turn off the lights.

In one embodiment, the one or more actions include controlling a light output of a light bulb and/or lighting fixture. In another embodiment, the one or more actions include displaying information for a user via the user interface.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
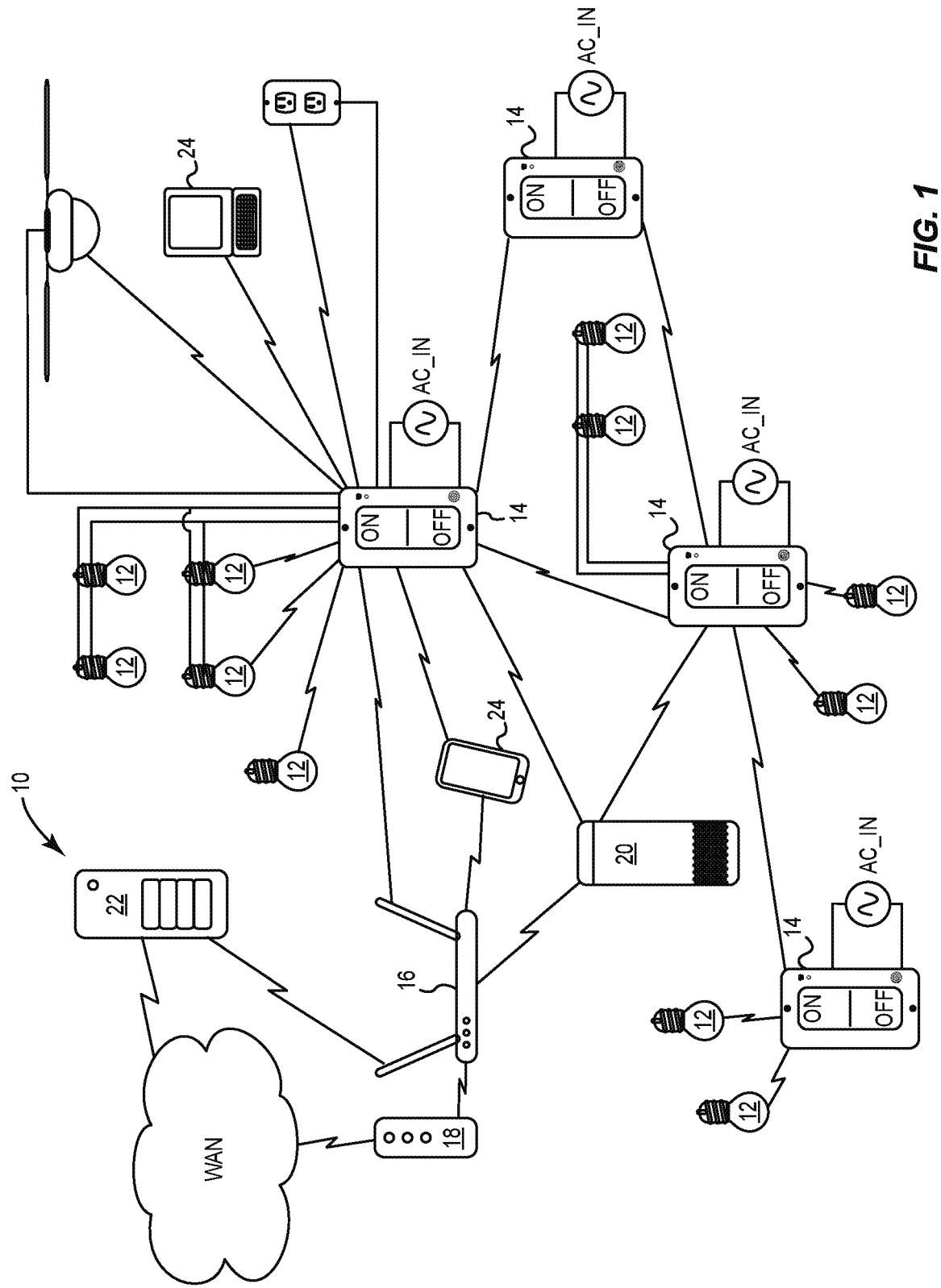
FIG. 1 is a diagram illustrating a lighting network according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As generally used herein, a "dumb" light or device is one that is simply controlled by adjusting or cutting of the power to the device, e.g. by a conventional light switch or TRIAC dimmer. A "smart" light or device is a device that includes decision making capability such that it can respond to signals, commands, feedback and/or information from sensors or other devices to adjust its operation.

FIG. 1 shows a lighting network 10 according to one embodiment of the present disclosure. The lighting network 10 includes a number of light bulbs 12 (which, while not shown as such, may also be lighting fixtures without departing from the principles of the present disclosure), a number of lighting wall controls 14, a router 16, a gateway 18, a voice control appliance 20, a voice control server 22, and a connected device 24, such as a smartphone, tablet, computer. Each one of these devices is connected to one another, either directly or via an intermediate device. These connections are illustrated in FIG. 1 as lines located between the devices, and may represent wired or wireless connections in any number of different communications technologies and/or protocols.

For example, each one of the lighting wall controls 14 may include multiple communication interfaces as discussed below in order to communicate with the light bulbs 12 using a first communication technology and/or protocol, communicate with the smartphone 24 using a second communication technology and/or protocol, and communicate with the voice control server 22 using a third communication technology and/or protocol.

Together, the light bulbs 12, the lighting wall controls 14, the router 16, the voice control appliance 20, the voice control server 22, and the smartphone 24 may form a local-area network (LAN). Communications between these devices may occur directly or through one or more intermediate devices such as the router 16, which may facilitate communications between all of the devices. The gateway 18 may connect the LAN to a wide-area network (WAN), such as the Internet. In some embodiments, the voice control server 22 may connect to the devices in the lighting network 10 via the LAN. In other embodiments, the voice control server 22 connects to the devices in the lighting network via the WAN.

The light bulbs 12 are configured to receive power, for example, from an alternating current (AC) line source along with one or more control signals and provide a light output based thereon. One or more of the light bulbs 12 may be "dumb" bulbs that are conventionally controlled, for example by an AC input signal AC_IN. These light bulbs 12 generally provide a light output that is proportional to an average amount of energy provided by the AC input signal AC_IN (e.g., via a triode for alternating current (TRIAC) dimmer), and do not include a means for communicating with other devices. Other light bulbs 12 may be "smart" bulbs equipped with electronics to provide decision making capabilities and communications circuitry such that they are capable of receiving data from other devices such as one or more of the lighting wall controls 14 and adjusting the light output thereof based on the commands. In some embodiments, these "smart" light bulbs 12 may also be controlled by conventional means as discussed above.

Each one of the lighting wall controls 14 is configured to receive user input and power, for example, from an AC line source, and control a light output from one or more of the light bulbs 12 in response thereto. The lighting wall controls 14 may do so by providing a user interface, which may be mechanical or software based (e.g., a touchscreen). To control the light output of the light bulbs 12, the lighting wall controls 14 may provide the control signals thereto via a wired communications interface or a wireless communications interface. The wired control signals may be conventional alternating current (AC) dimmer signals (e.g., as provided by a dimmer switch such as a TRIAC dimmer), commands sent via an AC line interface (e.g., by modulating or otherwise transmitting data over the AC line), and/or Ethernet control signals. The wireless control signals may be Bluetooth, Zigbee, Thread, and/or Z-Wave control signals. In short, any type of wired or wireless control signals may be used to control a light output of the light bulbs 12, and the type of control signals used may be dependent on the individual light bulbs 12 themselves as discussed above.

In addition to the above, each one of the lighting wall controls 14 may communicate among themselves in order to synchronize tasks, share sensor data, coordinate listening for or responding to voice commands from a user, or the like. In one embodiment, the lighting wall controls 14 form a mesh network or a light mesh network in order to communicate with one another. Accordingly, the lighting wall controls 14 may relay commands between one another, allowing voice commands or user input provided at one of the lighting wall controls 14 to execute one or more actions on a different lighting wall control 14. For example, a voice command from a user may indicate that the user wishes to dim the lights in a particular location, such as the master bedroom. If the voice command is not received by a lighting wall control 14 located in the master bedroom, the lighting wall control 14 may relay this command to the appropriate lighting wall control 14, thereby allowing for the execution of the command.

To this end, each one of the lighting wall controls 14 may be associated with a particular location in a space. For example, a lighting wall control 14 may be associated with a master bedroom, a kitchen, a conference room, or the like. These locations, which may be provided by a user, determined automatically, or some combination thereof, may allow a user to provide voice commands that are spatially oriented such as the example given above where a user wishes to dim the lights in a master bedroom. Such a voice command will be communicated as necessary to the appropriate lighting wall controller 14 in order to execute the command. Associating the lighting wall controls 14 with locations may be especially important when the light bulbs 12 connected thereto are conventionally controlled, since the lighting wall control 14 is then the exclusive control point for the light output of these conventionally controlled light bulbs 12. When the light bulbs 12 include their own communications circuitry, intervening lighting wall controllers 14 may be bypassed such that the lighting wall controller 14 receiving a voice command may adjust the light output of the light bulbs 12 regardless of whether it is physically attached to them or located in the same room. In such scenarios, the light bulbs 12 themselves may be associated with a particular location in order to effectuate such behavior.

Notably, the lighting wall controllers 14 may control other "smart" devices in addition to the light bulbs 12. For example, the lighting wall controllers 14 may directly or indirectly provide commands to door locks, thermostats, media controllers, connected power outlets, and the like based on voice commands from a user as described in detail below.

In the embodiment shown in FIG. 1, the lighting wall controls 14 act as a gateway for the light bulbs 12, connecting them to the lighting network 10. However, in one embodiment a separate lighting gateway is provided through which the light bulbs 12 and the lighting wall controls 14 connect to other devices in the lighting network 10. In such an embodiment, the lighting wall controls 14 may have a reduced number of communication interfaces in order to simplify the design thereof.

The control signals provided from the lighting wall controls 14 to the light bulbs 12 may control any number of different parameters of the light provided therefrom. For example, the control signals from the lighting wall controls 14 may cause the light bulbs 12 to change an intensity of a light provided therefrom, a color of the light provided therefrom, a color temperature of the light provided therefrom, a color rendering index of the light provided therefrom, or any other desired parameter.

Each of the lighting wall controls 14 may control different groups of light bulbs 12 throughout the lighting network 10. These groups of light bulbs 12 may be controlled via different communication interfaces as shown in FIG. 1. For example, the lighting wall controls 14 may control the light output of a first group of light bulbs 12 via an AC interface, providing AC dimming signals thereto. Accordingly, the lighting wall controls 14 may be connected to the first group of light bulbs 12 via an AC line. Further, the lighting wall controls 14 may control the light output of a second group of light bulbs 12 via a wireless interface such as those discussed above. Accordingly, the lighting wall controls 14 do not have to be connected to the second group of light bulbs 12 directly. The lighting wall controls 14 may operate the first group of light bulbs 12 and the second group of light bulbs 12 in a dependent (i.e., synchronous) or independent manner. That is, the lighting wall controls 14 may ensure that the light output from the first group of light bulbs 12 substantially matches that of the second group of light bulbs 12, or may operate the light bulbs 12 such that the light output from the first group of light bulbs 12 is different from that of the second group of light bulbs 12. In this way, the lighting wall controls 14 may "bridge" the control of multiple groups of light bulbs 12 in the lighting network 10, each of which may be operate via a different communications interface in order to provide seamless control of light bulbs 12 throughout a space. While the lighting wall controls 14 are shown coupled to separate light bulbs 12 in the lighting network 10, the light bulbs 12 controlled by each one of the lighting wall controls 14 may overlap in some embodiments. As discussed above, lighting wall controls 14 in the lighting network 10 may receive user input or voice commands from users which require execution of actions on other lighting wall controls 14. This may occur, for example, when changes to a light output of light bulbs 12 or group of light bulbs 12 exclusively controlled by a particular lighting wall control 14 are requested by a user from a different lighting wall controller 14 or another device. This information may be passed to the appropriate lighting wall control 14 as necessary to execute these actions as discussed above.

The lighting wall controls 14 may receive commands from the connected device 24 such as a smartphone via a wired or wireless interface. As discussed above, the connected device 24 may be any suitable device such as a tablet, a smart watch, a dedicated remote control, or the like. In various embodiments, these commands may traverse one or more intermediate devices in the lighting network 10 before reaching one or more of the lighting wall controls 14. In response to these commands, one or more of the lighting wall controls 14 may provide control signals to the light bulbs 12 in order to change a light output thereof.

In addition to the above, the lighting wall controls 14 may receive commands from the voice control appliance 20 via a wired or wireless interface. As discussed above, the voice control appliance 20 is a standalone device for responding to voice commands from a user. Commands may be generated by the voice control appliance 20 in response to voice input from a user. In generating the commands, the voice control appliance 20 may interact with the voice control server 22. The voice control appliance 20 and/or voice control server 22 may be configured to determine actions to take based on the voice commands from the user and relay these commands back to a requesting device. The computational complexity associated with natural language processing may necessitate the use of the voice control server 22 in some situations, since it may not be feasible to perform these computations on other devices in the lighting network 10 that may have limited processing power and/or stringent efficiency requirements.

While the voice control appliance 20 may provide a convenient way to interact with one or more devices, a lighting network 10 may require several of them in order to adequately listen for voice commands within a given space. Since the voice control appliance 20 is a separate device dedicated only to that task, it may be expensive or inconvenient for a user to place a number of these throughout a space to provide the desired level of coverage. Generally, these voice control appliances 20 recognize voice commands from a user in a relatively limited area. Accordingly, a substantial number of these devices must be placed strategically throughout a space in order to provide the desired functionality throughout the space. Further, these voice control appliances often require access to a power outlet, which may be problematic and/or produce unsightly results. The demands of these standalone devices may necessitate sub-optimal placement thereof such that the space in which voice commands are recognized is further reduced. Lighting wall controls 14 such as the one shown in FIG. 1 may be located in every room of a space, and in some cases in more than one place in a room. Further, these lighting wall controls 14 have access to power and are discreet in their appearance when compared to a dedicated device for which a user must find an appropriate spot. Finally, the placement of most lighting wall controllers 14 provides unrestricted access to sound waves in the surrounding area, and thus will be easily able to detect voice commands from a user. Accordingly, in order to provide voice control throughout the entirety of a space voice control or "virtual assistant" functionality is provided in the lighting wall controls 14 as discussed below.

Figure 2:
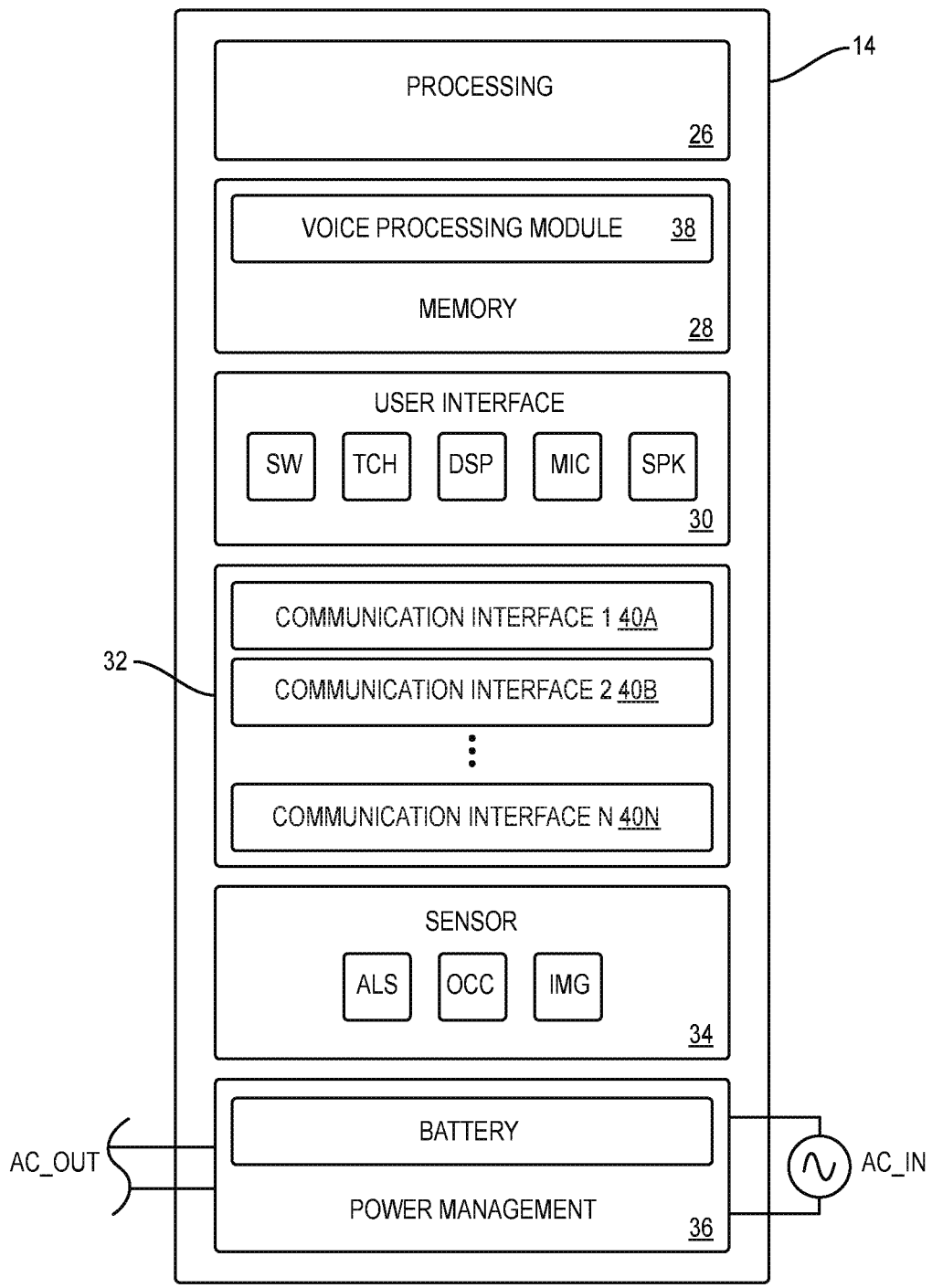
FIG. 2 is a functional schematic illustrating a lighting wall controller according to one embodiment of the present disclosure.

FIG. 2 shows details of a lighting wall control 14 according to one embodiment of the present disclosure. The lighting wall control 14 includes processing circuitry 26, a memory 28, a user interface 30, communications circuitry 32, sensor circuitry 34, and power management circuitry 36. The processing circuitry 26 is configured to execute instructions stored in the memory 28 in order to provide the primary intelligence of the lighting wall control 14. In one embodiment, the memory 28 includes a voice processing module 38, which is a set of instructions stored in the memory 28 configured to allow the lighting wall control 14 to process voice commands as discussed below. While not shown, additional modules such as a fault detection module for detecting failures within the lighting wall control 14, a diagnostic module for diagnosing said errors, and a protection module for security or other purposes may be provided as instructions stored in the memory 28 or discrete circuitry in the lighting wall control 14 to increase the robustness of the device.

The user interface 30 allows a user to interact with the lighting wall control 14, and may provide several ways to do so. For example, the user interface 30 may include a switch SW, which may be mechanical or any other type of switch, a capacitive or otherwise touch sensitive interface TCH, a display DSP, or the like. In some embodiments the user interface 30 may include a touchless interface (not shown), such as a three-dimensional gesture sensor, which may be provided using various sensors such as an image sensor. The display may be as simple or complex as desired. For example, the display may be an indicator LED, multiple indicator LEDs, an LED array, a full display such as a liquid crystal display (LCD), or any combination thereof. To provide the voice control capability discussed herein, the user interface 30 may include a microphone MIC and a speaker SPK. The microphone MIC may include multiple microphones, which may be provided in an array in order to more accurately recognize voice commands from a user. Further, the speaker SPK may include multiple speakers in order to provide better sound, or may connect to one or more remote speakers in order to provide audible feedback to a user.

The communications circuitry 32 may include multiple communications interfaces 40, each of which may utilize a different communications technology and/or protocol to communicate with other devices in the lighting network 10. For example, a first communication interface 40A may be a WiFi communications interface, a second communication interface 40B may be a Bluetooth communications interface, and an $n^{th}$ communication interface 40N may be a IEEE 802.15 communications interface. In short, the communications circuitry 32 may include any number of different communications interfaces 40 in order to communicate with a variety of devices in the lighting network 10. As discussed above, in some embodiments the lighting wall control 14 may include a limited number of communications interfaces 40, and may communicate to other devices in the lighting network 10 via a separate lighting gateway.

The sensor circuitry 34 may include any number of sensors to allow the lighting wall control 14 to receive input from the surrounding environment. For example, the sensor circuitry 34 may include an ambient light sensor ALS, an occupancy sensor OCC, and an image sensor IMG. The ambient light sensor ALS may provide a measurement of the ambient light in the surrounding environment to the lighting wall control 14, which it may use to control a light output from one or more of the light bulbs 12. The occupancy sensor OCC may indicate whether or not the environment surrounding the lighting wall control 14 is occupied by a person, which may be used by the lighting wall control 14 to turn on and off the light bulbs 12. The image sensor IMG may be used to detect ambient light, occupancy, motion, and other light characteristics of the light bulbs 12. Any of these measurements may be used to adjust a light output of the light bulbs 12 in a desired fashion. Further, any number of additional sensor may be added to the sensor circuitry 34 (e.g., temperature sensors, barometric pressure sensors, accelerometers, or the like) in order to allow the lighting wall control 14 to collect additional information about the surrounding environment.

The power management circuitry 36 may be configured to receive an AC input signal AC_IN, for example, an AC line voltage, and provide an AC output signal AC_OUT to one or more of the light bulbs 12. In doing so, the lighting wall control 14 may dim or otherwise alter the light output of the light bulbs. In one embodiment, the power management circuitry 36 includes an AC dimmer (not shown). In other embodiments, the power management circuitry 36 includes power converter circuitry such as AC to direct current (DC) converter circuitry, power factor correction circuitry, rectifier circuitry, or the like (not shown). In some embodiments, the power management circuitry 36 may be configured to be wired in a three-way, four-way, or multiple-way AC circuit. The power management circuitry 36 may cooperate with the processing circuitry 26 in order to properly respond to AC signals received from other switches in the multiple-way configuration and to properly provide AC signals to other switches in the multiple-way configuration in order for all of the switches in the circuit to properly function. Where multiple switches in the circuit are lighting wall controls 14 including intelligence such as the one discussed herein, the lighting wall controls 14 may effectuate the multiple-way behavior by communicating in a wired or wireless manner. Where some of the switches in the circuit are "dumb" switches, the lighting wall control 14 may manipulate an AC output thereof in order to effectuate the multiple-way behavior. The lighting wall control 14 may require pass-through or constant AC power to provide all of the functionality thereof, and such considerations must therefore be taken when including the lighting wall control in a multiple-way circuit. In addition to receiving AC input signals AC_IN, the power management circuitry 36 may also be configured to receive DC input signals, condition or otherwise alter these signals as desired, and provide one or more output signals to the light bulbs 12 to control the light output thereof. In some embodiments, the power management circuitry 36 may include a battery to provide power in the event of a power outage, or to ensure storage of settings or otherwise operate one or more aspects of the lighting wall control 14 when line power is not available.

Figure 3:
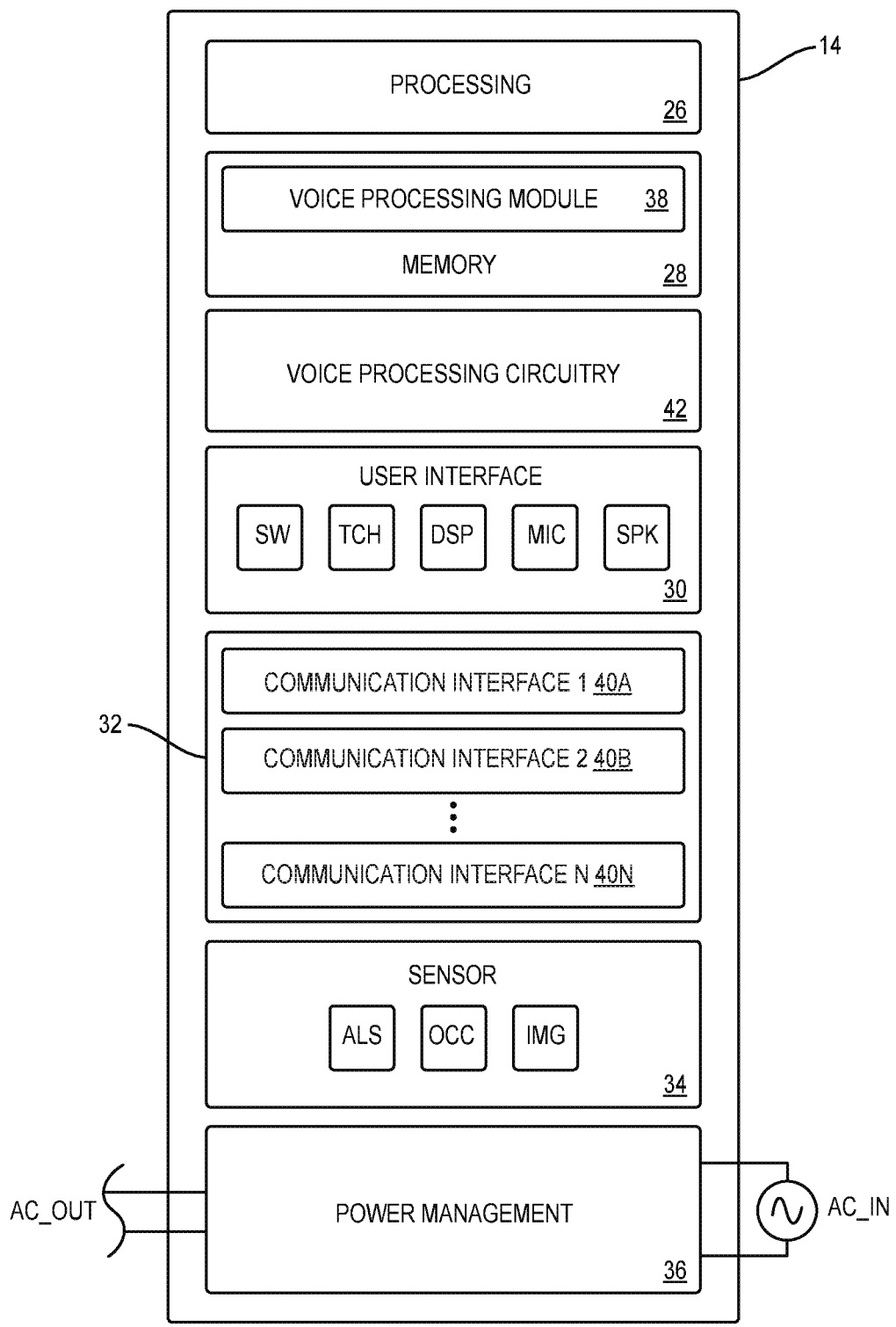
FIG. 3 is a functional schematic illustrating a lighting wall controller according to one embodiment of the present disclosure.

FIG. 3 shows a lighting wall control 14 according to an additional embodiment of the present disclosure. The lighting wall control 14 shown in FIG. 3 is substantially similar to that shown in FIG. 2, but further includes dedicated voice processing circuitry 42 therein. The dedicated voice processing circuitry 42 may be optimized for recognizing human speech. In one embodiment, the dedicated voice processing circuitry 42 is configured to transcribe spoken words into text, data, or any appropriate form, which may then be parsed to determine one or more actions to be taken based thereon. Further, the dedicated voice processing circuitry 42 may be optimized to listen for a "trigger phrase", which may indicate that a person is providing a voice command to the lighting wall control 14. Listening for a trigger phrase may prevent the lighting wall control 14 from recording all spoken words in the surrounding environment in order to increase the privacy of users. To reduce the power consumption of the voice processing circuitry 42 and therefore optimize efficiency, it may be provided as a specialized application-specific integrated circuit (ASIC), a field-programmable gate array (FPGA), or the like. Providing dedicated voice processing circuitry 42 in the lighting wall control 14 may free up valuable processing power in the processing circuitry 26 for performing other tasks.

Figure 4:
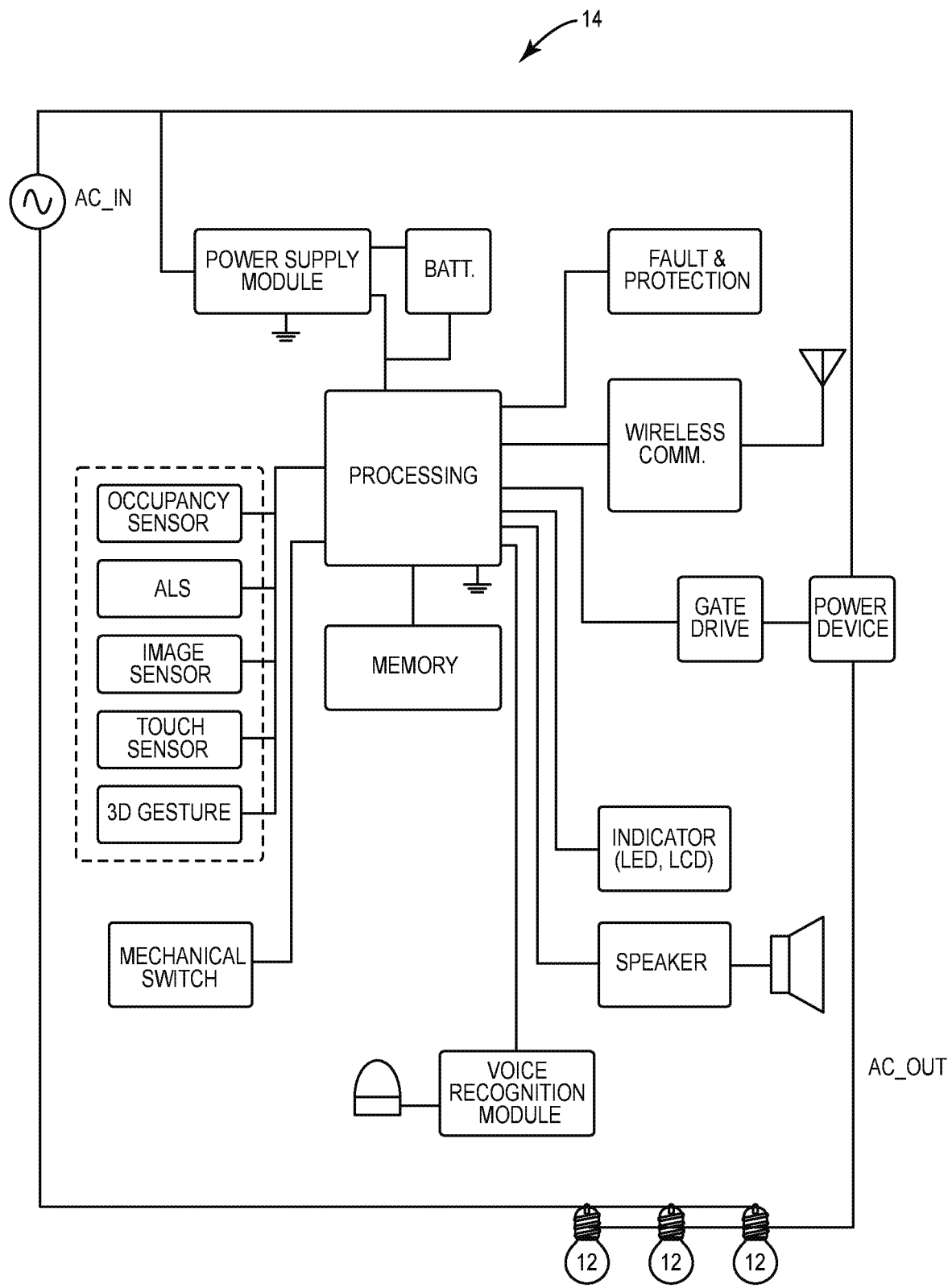
FIG. 4 is a functional schematic illustrating a lighting wall controller according to one embodiment of the present disclosure.

FIG. 4 shows a lighting wall controller 14 according to an additional embodiment of the present disclosure. For reference, a number of light bulbs 12 are also shown. The lighting wall controller 14 includes processing circuitry, which is configured to execute instructions stored in a memory to provide the central intelligence of the lighting wall controller 14. A power supply module, along with a battery connected thereto, receives an AC input signal AC_IN and provides power to the processing circuitry, which may be distributed to other portions of the device. Fault and protection circuitry increases the robustness of the lighting wall controller by detecting faults and responding thereto. Wireless communications circuitry allows the lighting wall controller to communicate with other devices in the lighting network 10. Gate drive circuitry controls a power device, which is in line with the AC line voltage provided to the light bulbs 12 in order to control the light output thereof in a conventional manner as discussed above. The power device may be a transistor device or any other suitable device for controlling the amount of energy delivered to the light bulbs 12. An indicator such as an LED or an LCD is provided, and may be used to provide feedback to a user as discussed above. A speaker and associated circuitry may similarly be used to provide audible feedback to a user. A voice recognition module along with a microphone attached thereto allows the lighting wall control 14 to receive and respond to voice commands. A mechanical switch allows a user to cut power to the light bulbs 12 when desired. A number of sensors including an occupancy sensor, an ambient light sensor, an image sensor, a touch sensor (which may be a capacitive touch sensor), and a three-dimensional gesture sensor allow the lighting wall control 14 to receive input from the surrounding environment. The processing circuitry is coupled to each one of the fault and protection circuitry, the wireless communications circuitry, the gate drive circuitry, the indicator, the speaker, the voice recognition module, the mechanical switch, and the sensors. Accordingly, the processing circuitry may receive input from these portions of the device or provide commands thereto to direct the activity of the lighting wall control 14. In various embodiments, the processing circuitry may be a microcontroller unit or the like.

Figure 5:
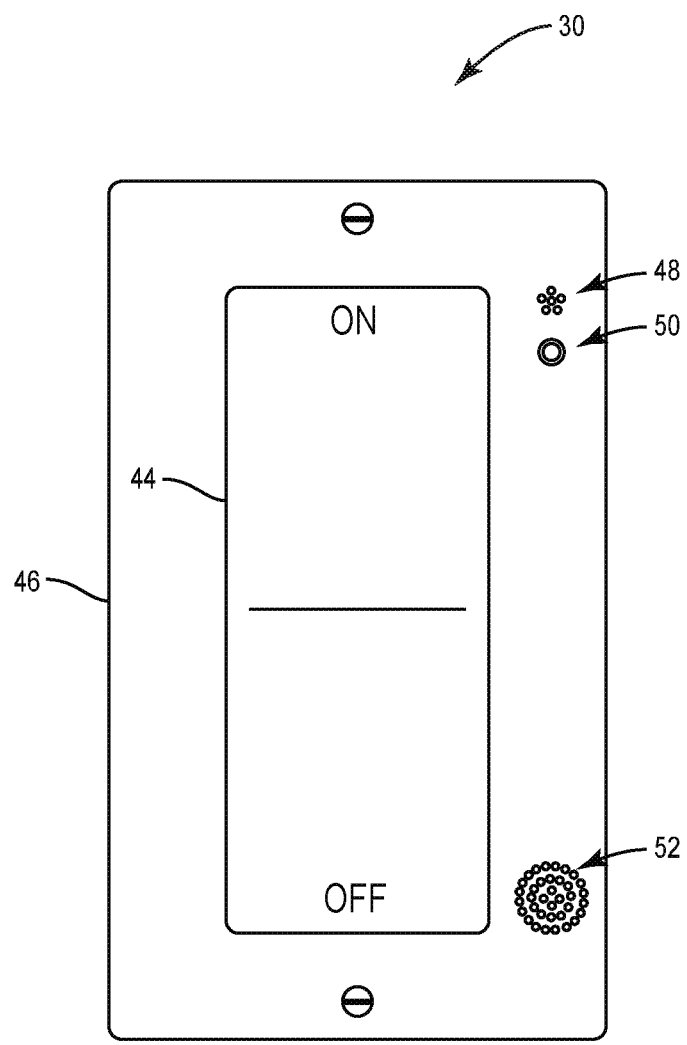
FIG. 5 is a diagram of a user interface for a lighting wall controller according to one embodiment of the present disclosure.

FIG. 5 shows a user interface 30 for a lighting wall control 14 according to one embodiment of the present disclosure. As shown, the user interface 30 includes a touch panel 44, which may be mechanical, capacitive, or otherwise touch sensitive. Further, while referred to as a "touch" panel, the touch panel 44 may respond to non-touch gestures such as those performed by a user in the space surrounding the lighting wall control 14. The touch panel 44 may control the intensity of light provided by light bulbs 12 controlled by the lighting wall controller based on input from a user. A faceplate 46 is provided around the touch panel 44. The faceplate 46 may include a first opening 48, a second opening 50, and a third opening 52. The first opening 48 may provide the microphone MIC access to the surrounding environment so that voice commands from a user may be detected. The second opening 50 may provide optical access to the surrounding environment for one or more of the ambient light sensor ALS, the occupancy sensor OCC, and the image sensor IMG. Additional openings may be provided in embodiments in which more than one of these sensors is provided. The third opening 52 may provide the speaker SPK access to the surrounding environment so that audible feedback and other sounds may be provided from the lighting wall control 14.

Figure 6:
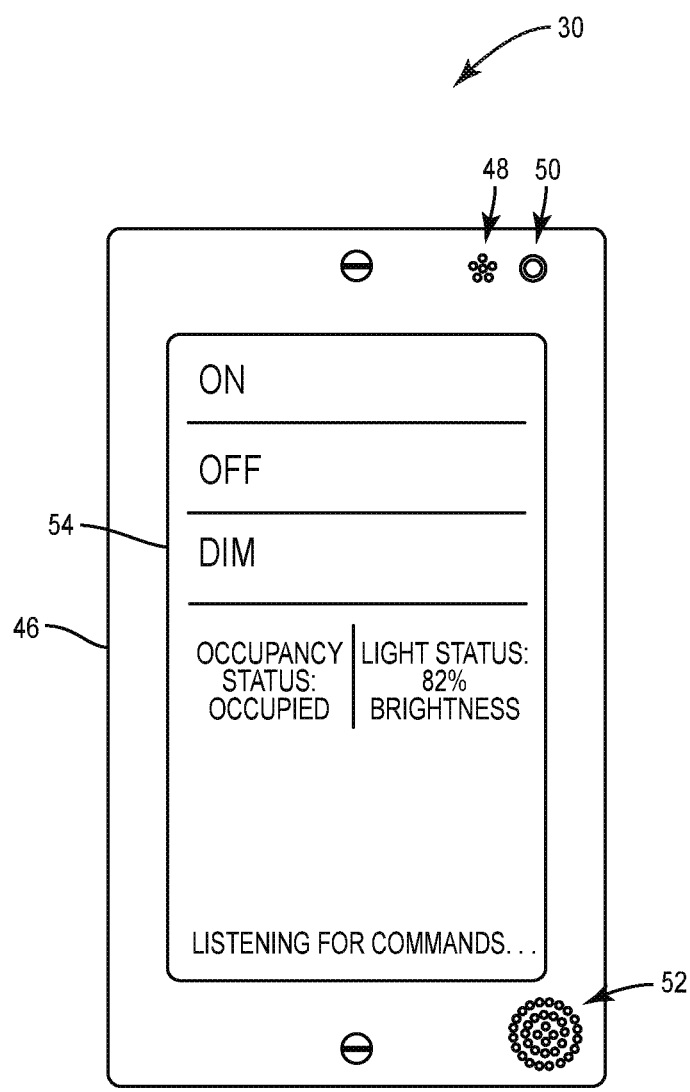
FIG. 6 is a diagram of a user interface for a lighting wall controller according to one embodiment of the present disclosure.

FIG. 6 shows a user interface 30 for a lighting wall control 14 according to an additional embodiment of the present disclosure. The user interface 30 is substantially similar to that shown in FIG. 5, except that the touch panel 44 shown in FIG. 5 is replaced with a touchscreen 54. The touchscreen may display information about the light bulbs 12 controlled by the lighting wall control 14 as well as any other devices in the lighting network 10. For example, the touchscreen 54 may display the current occupancy status and the current brightness setting of the light bulbs 12 as shown in FIG. 6. Controls that are often used may be displayed in a prominent manner to allow a user to easily and intuitively control a light output of the light bulbs 12 connected to the lighting wall control 14. An indicator may be provided that the lighting wall control 14 is currently ready for voice commands from a user.

Figure 7:
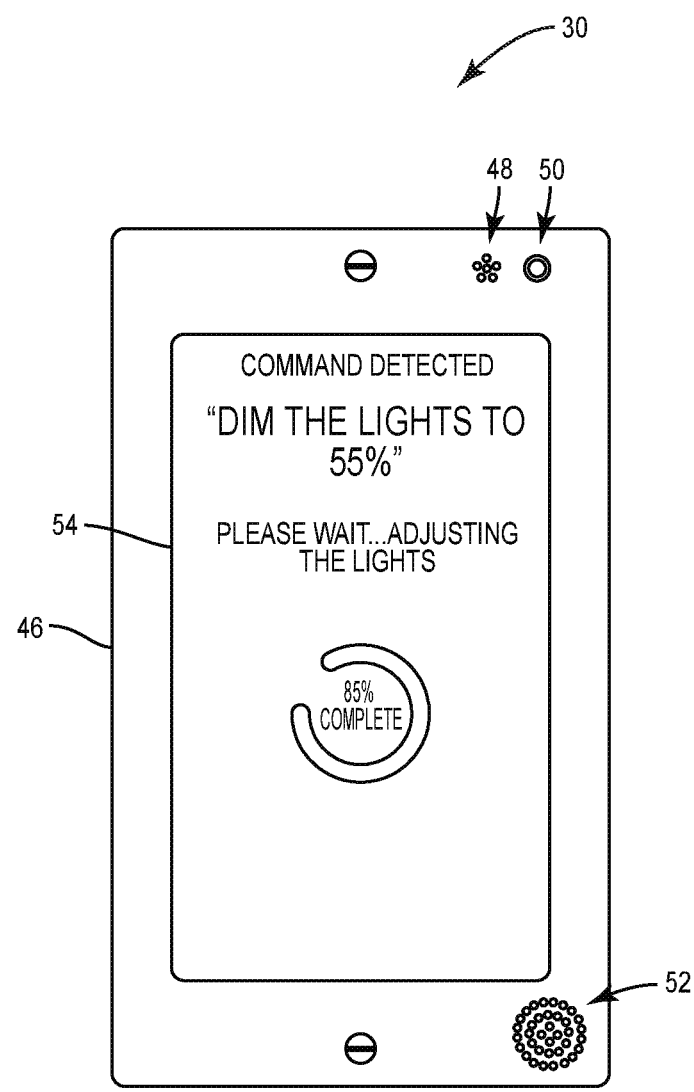
FIG. 7 is a diagram of a user interface of a lighting wall controller according to one embodiment of the present disclosure.

FIG. 7 shows the user interface 30 illustrated in FIG. 6 after a voice command has been detected by a user. The touchscreen 54 may indicate the command that was detected and indicate an action that is currently being executed in response thereto. In some embodiments, a progress indicator may be provided. Further, feedback may be solicited to refine the accuracy of voice recognition of the lighting wall control 14. For example, a prompt on the screen may ask whether the detected voice command was accurately transcribed, and whether the resulting action was the intended consequence of the detected voice command. After receiving this feedback, the lighting wall control 14 and/or a backend device used for responding to the voice commands may alter the transcription and/or response to the voice commands in order to better respond to voice commands over time.

Figure 8:
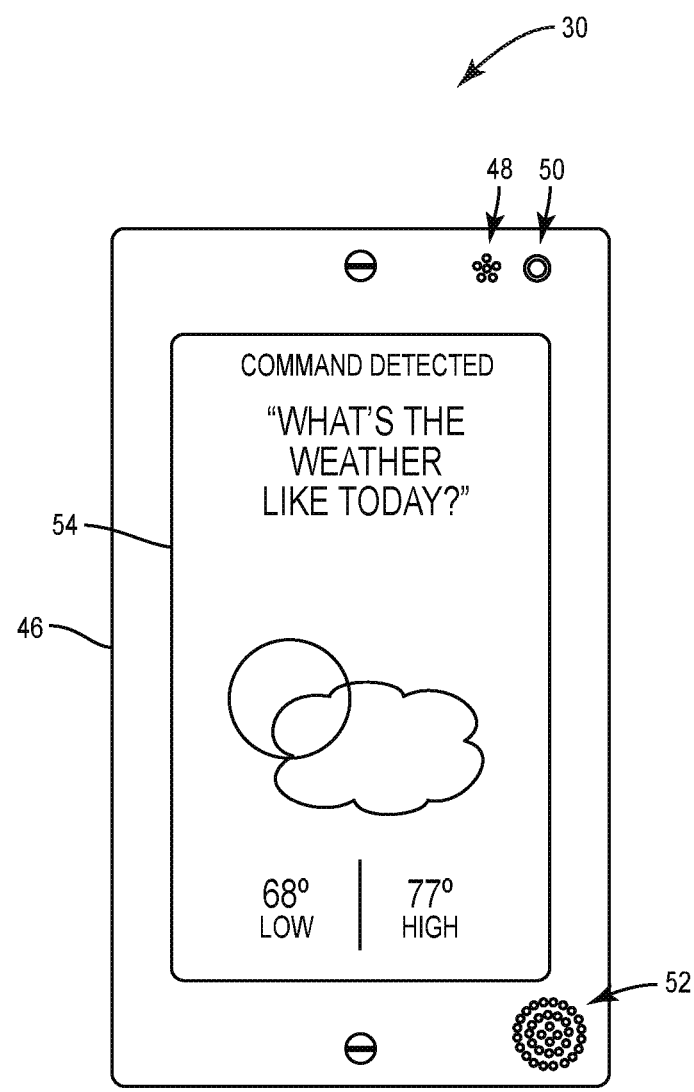
FIG. 8 is a diagram of a user interface of a lighting wall controller according to one embodiment of the present disclosure.

FIG. 8 shows the user interface 30 illustrated in FIG. 6 after a different type of voice command has been detected by a user. While voice commands may be used to instruct the lighting wall control 14 to provide control signals to one or more other devices, they may also be used to request information from the lighting wall control 14, which must then be displayed or otherwise communicated to the user. For example, a user may ask for the weather forecast, which may then be displayed as shown in FIG. 8. Other types of information may be requested and displayed as well. In various embodiments, audible feedback may be provided by the user in addition to displaying the information on the touchscreen 54 or other user interface. Such audible feedback may include computer generated speech responding to the request from the user.

Figure 9:
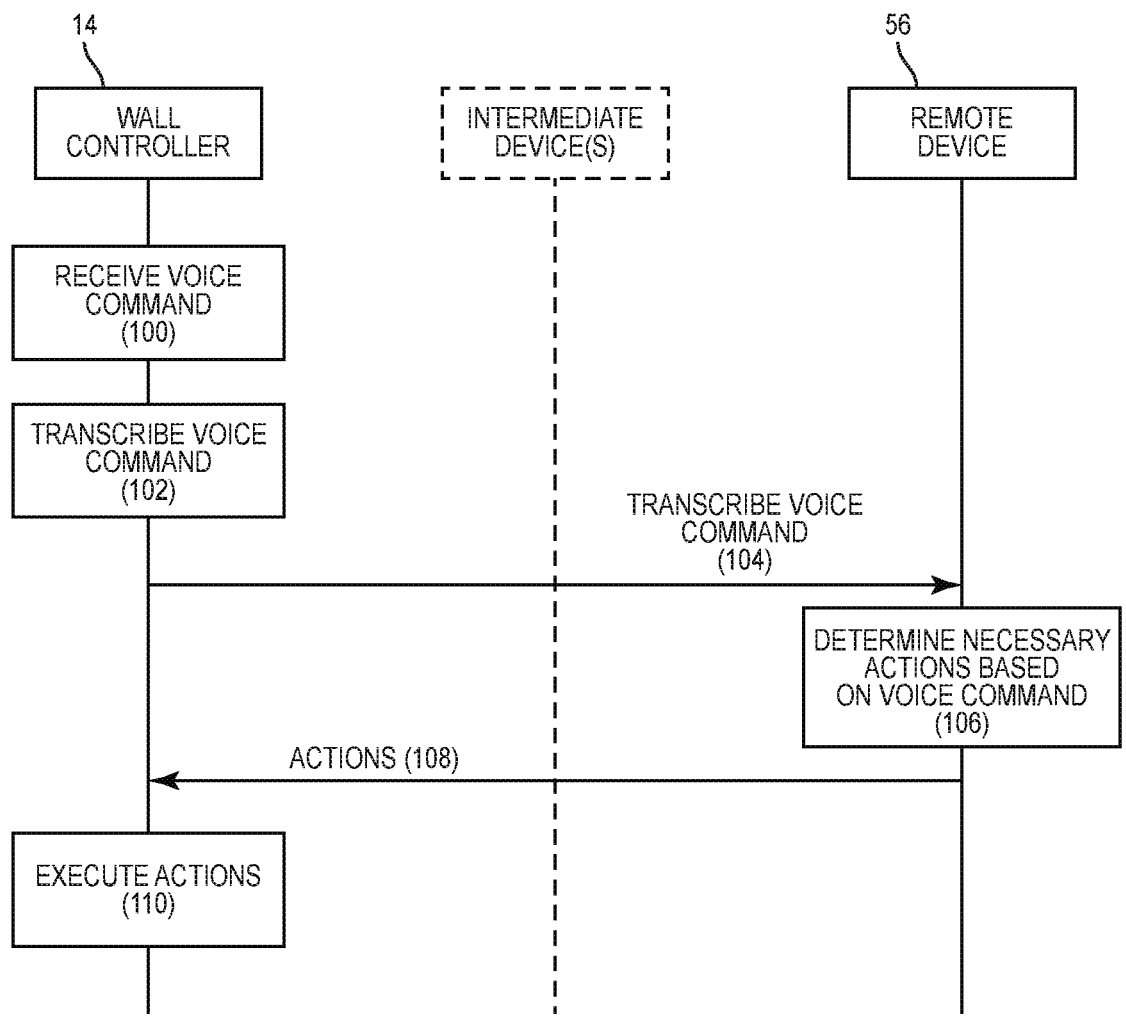
FIG. 9 is a call-flow diagram illustrating communication between a lighting wall controller and a remote device according to one embodiment of the present disclosure.

FIG. 9 is a call flow diagram illustrating communications between a lighting wall control 14 and a remote device 56 in order to execute one or more actions based on voice commands from a user according to one embodiment of the present disclosure. First, a voice command is received from a user (100). To receive a voice command, the lighting wall control 14 may constantly listen for voice commands and/or trigger phrases via the microphone MIC as discussed above. The voice command may then be transcribed into text, data representative of the voice command, or any appropriate form (102). The voice transcription may be accomplished via the processing circuitry 26 or the dedicated voice processing circuitry 42. The transcribed voice command is then sent to a remote device 56 (104), which may be the voice control appliance 20, the voice control server 22, or any other device, through one or more intermediate devices (e.g., the router 16, the gateway 18, or any other device). The remote device 56 determines any necessary actions to be taken based on the transcribed voice command (106). For example, the remote device 56 may use natural language processing along with machine learning algorithms to determine the intent of the voice command and how to respond. These actions are then sent back to the lighting wall control 14 (108), where they are executed thereby (110).

As discussed above, the actions may include changing a light output of one or more of the light bulbs 12, displaying information, controlling one or more other devices in the lighting network 10, or any other task. For example, a user may request the lighting wall control 14 to "Turn on the lights," to "Set the brightness of the lights in conference room 1 to 80%," or to "Turn on the projector." The lighting wall control 14 along with the remote device will determine the necessary actions to be taken based on these requests.

Figure 10:
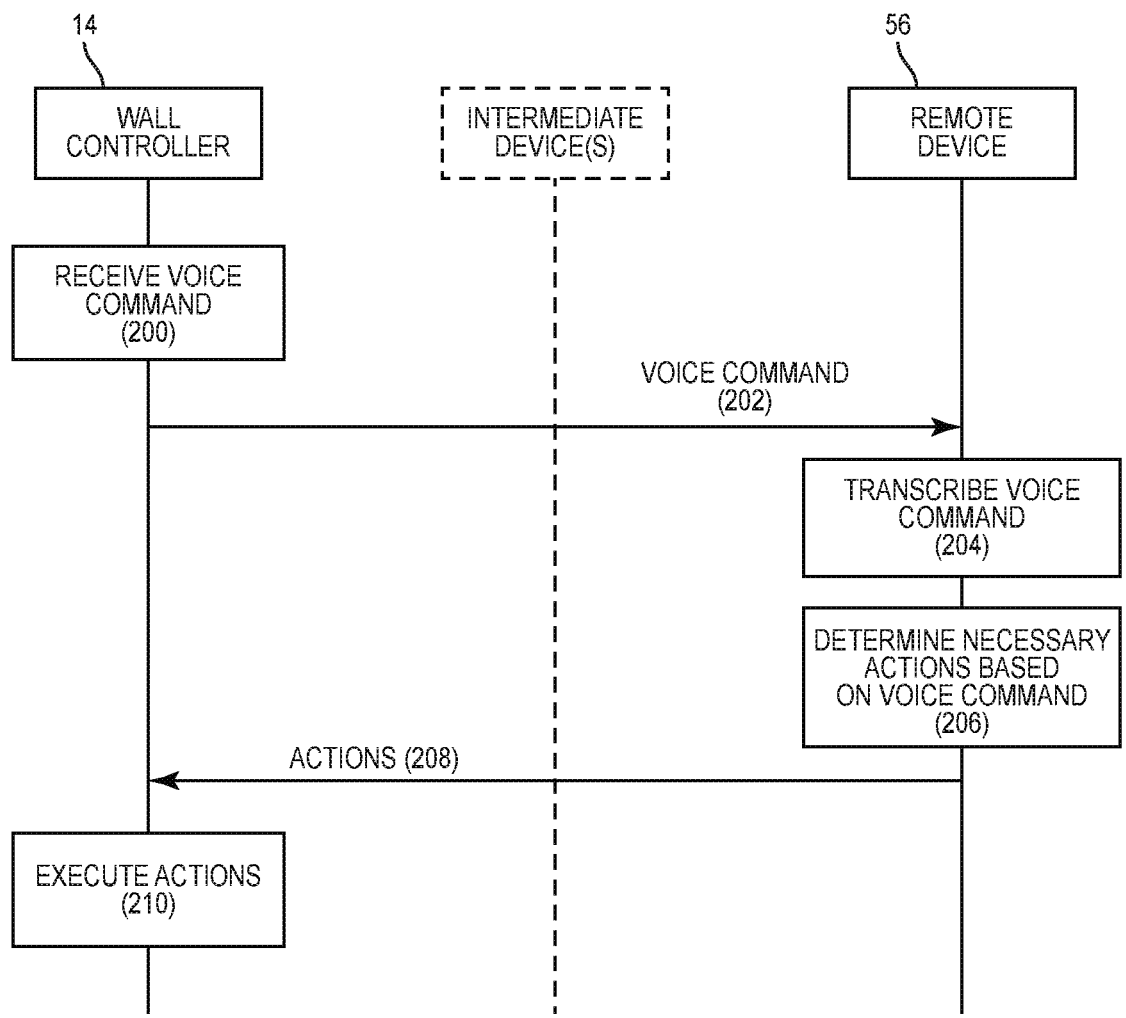
FIG. 10 is a call-flow diagram illustrating communication between a lighting wall controller and a remote device according to one embodiment of the present disclosure.

FIG. 10 is a call flow diagram illustrating communications between a lighting wall control 14 and a remote device 56 in order to execute one or more actions based on voice commands from a user according to an additional embodiment of the present disclosure. First, a voice command is received from a user (200). The voice command is then sent to a remote device 56 (202). As discussed above, the remote device 56 may be the voice control appliance 20, the voice control server 22, or any other device, and communication with the remote device may occur between one or more intermediate devices. Sending the voice command to the remote device 56 may include performing analog-to-digital conversion of the voice command from the user and sending a digital version thereof to the remote device 56. In some embodiments, compression may be applied to the digital version of the voice command in order to reduce the required bandwidth of communication between the lighting wall control 14 and the remote device 56. The remote device 56 may then transcribe the voice command (204) using dedicated hardware or software as discussed above, and may determine any necessary actions to be taken based on the transcribed voice command (206) as discussed above. These actions are then sent back to the lighting wall control 14 (208), where they are executed thereby (210).

Figure 11:
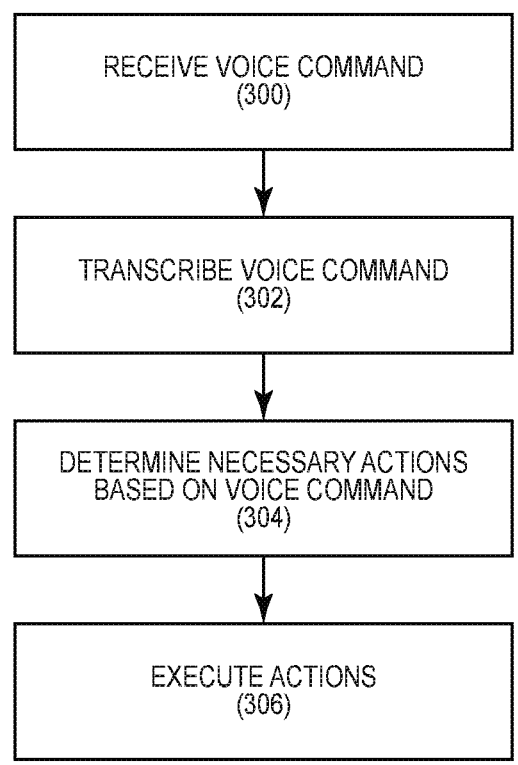
FIG. 11 is a flow diagram illustrating a method of processing one or more voice commands according to one embodiment of the present disclosure.

FIG. 11 is a flow diagram illustrating a method for responding to voice commands from the lighting wall control 14 according to one embodiment of the present disclosure. First, a voice command is received (300). The voice command is then transcribed into text, data representative of the voice command, or any appropriate form (302) for further processing. Necessary actions based on the transcribed voice command are then determined (304), and executed (306) by the lighting wall control 14. Notably, the transcription and determination of actions based on the transcribed voice command are performed locally on the lighting wall control 14 in the embodiment shown in FIG. 11. This may be enabled by the dedicated voice processing circuitry 42 discussed above.

The above approaches in FIGS. 9-11 illustrate different ways that the lighting wall control 14 could cooperate with a remote device such as the voice control appliance 20 and a voice control server 22 in order to respond to voice commands from a user. In particular, they illustrate different ways to distribute the transcription and processing of voice commands from a user to accomplish a desired task based thereon. The above approaches illustrate that the voice processing module 38 and/or the voice processing circuitry 42 in the lighting wall control 14 may perform several different levels of voice processing based on the embodiment. For example, the voice processing performed by the voice processing module 38 and/or the voice processing circuitry 42 may be a simple analog-to-digital conversion, or may involve more intensive processing such as voice-to-text transcription. In certain applications, the voice processing module 38 and/or the voice processing circuitry 42 may work alongside the processing circuitry 26 in order to perform even more intensive processing such as natural language processing and the like in order to determine a desired action to be performed based on the voice commands. In short, the term "voice processing" used throughout the present application may indicate many different levels of intensity of processing of the voice commands.

Notably, the above are only exemplary approaches to such a problem. There are any numbers of ways in which a lighting wall controller could parse and respond to voice commands from a user, all of which are contemplated herein. Regardless of the details of how it is accomplished, providing hardware and accompanying software for detecting voice commands in a lighting wall control 14 allows voice command (i.e., "virtual assistant") functionality to be distributed throughout a space without the need for a multitude of dedicated hardware that may be expensive or unsightly. That is, due to the fact that lighting wall controls 14 are already integrated into a power infrastructure and distributed spatially throughout a home, these lighting wall controls 14 offer significant benefits for providing an interface for voice control over dedicated hardware.

Those skilled in the art will recognize improvements and modifications to the preferred embodiments of the present disclosure. For example, this disclosure has focused on a lighting wall controller, but depending on the embodiment, the wall controller according to principles of the present disclosure need not control lights (or at least not in the conventional fashion) even though it replaces a conventional light switch or is mounted where a conventional light switch would typically be located. Additionally, the wall controllers can network with each other in various network structures, including with other devices, lights and/or sensors. All such improvements and modifications are considered within the scope of the concepts disclosed herein and the claims that follow.

What is claimed is:

1. A lighting wall control comprising:
   a user interface;
   a voice processing module configured to process voice commands from a user;
   power management circuitry configured to receive an AC input signal and provide an AC output signal suitable for powering one or more lights and controlling a light output thereof;
   a communication interface configured to communicate with one or more additional lights; and
   processing circuitry coupled to the user interface, the voice processing module, the power management circuitry, and the communication interface, the processing circuitry configured to:
      adjust a light output of the one or more lights via the power management circuitry based on user input from the user interface and the voice commands processed by the voice processing module; and
      adjust a light output of the one or more additional lights based on the user input from the user interface and the voice commands from the voice processing module.

2. The lighting wall control of claim 1 wherein the communication interface is a wireless communication interface.

3. The lighting wall control of claim 1 wherein the processing circuitry is configured to control the light output of the one or more lights and the light output of the one or more additional lights in a synchronous manner.

4. The lighting wall control of claim 1 wherein the processing circuitry is configured to control the light output of the one or more lights independently.

5. The lighting wall control of claim 1 wherein the processing circuitry is configured to:
   receive commands from one or more other lighting wall controls via the communication interface, wherein the commands are generated from the one or more other lighting wall controls based on one of user input from a user interface and voice commands from a voice processing module; and
   adjust the light output of the one or more lights based on the commands.

6. The lighting wall control of claim 1 wherein the lighting wall control is configured to:
   receive the voice commands via a microphone;
   transcribe the voice commands; and
   determine one or more actions to be performed based on the transcribed voice commands.

7. The lighting wall control of claim 6 wherein the voice processing module is configured to process the voice commands by transcribing the voice commands.

8. The lighting wall control of claim 7 wherein the processing circuitry is configured to determine the one or more actions to be performed based on the transcribed voice commands.

9. The lighting wall control of claim 1 wherein the processing circuitry is further configured to:
transmit the voice commands to a remote server via the communication interface; and
receive one or more actions to be performed based on the voice commands from the remote server via the communication interface.

10. The lighting wall control of claim 9 wherein the voice processing module is configured to process the voice commands by performing an analog-to-digital conversion on the voice commands such that the voice commands transmitted to the remote server are transmitted in a digital format.

11. The lighting wall control of claim 9 wherein the processing circuitry is further configured to perform the one or more actions.

12. The lighting wall control of claim 1 wherein:
the voice processing module is configured to process the voice commands by transcribing the voice commands;
the processing circuitry is configured to transmit the transcribed voice commands to a remote server via the communication interface; and
the processing circuitry is configured to receive one or more actions to be performed based on the transcribed voice commands from the server via the communication interface.

13. The lighting wall control of claim 1 wherein the processing circuitry is configured to display visual information via the user interface in response to the voice commands.

14. The lighting wall control of claim 1 wherein the processing circuitry is further configured to request information from a remote server via the communication interface in response to the voice commands.

15. The lighting wall control of claim 1 wherein the processing circuitry is further configured to send a command to one or more other lighting wall controls via the communication interface based on the voice commands.

16. The lighting wall control of claim 1 further comprising a first communication interface and a second communication interface, wherein the processing circuitry is coupled to the first communication interface and the second communication interface and configured to:
transmit the voice commands to a remote server via the first communication interface;
receive one or more actions to be performed based on the voice commands from the remote server via the first communication interface; and
adjust the light output of the one or more lights via the second communication interface.

17. The lighting wall control of claim 16 wherein the voice processing module is configured to process the voice commands by performing an analog-to-digital conversion on the voice commands such that the voice commands transmitted to the remote server are transmitted in a digital format.

18. The lighting wall control of claim 16 wherein the first communication interface is configured to communicate with the remote server via a wide area network (WAN).

19. A lighting wall control comprising:
a user interface;
a voice processing module configured to process voice commands from a user;
power management circuitry configured to receive an AC input signal and provide an AC output signal suitable for powering one or more lights and controlling a light output thereof;
a communication interface configured to communicate with one or more additional lights; and
processing circuitry coupled to the user interface, the voice processing module, the power management circuitry, and the communication interface, the processing circuitry configured to:
adjust a light output of the one or more lights via the power management circuitry based on user input from the user interface and the voice commands processed by the voice processing module;
receive commands from one or more other lighting wall controls via the communication interface, wherein the commands are generated from the one or more other lighting wall controls based on one of user input from a user interface and voice commands from a voice processing module; and
adjust the light output of the one or more lights based on the commands from the one or more other lighting wall controls.

20. A lighting wall control comprising:
a user interface;
a voice processing module configured to process voice commands from a user;
a communication interface; and
processing circuitry coupled to the user interface, the voice processing module, and the communication interface, the processing circuitry configured to:
adjust a light output of one or more lights based on user input from the user interface and the voice commands processed by the voice processing module;
transmit the voice commands to a remote server via the communication interface; and
receive one or more actions to be performed based on the voice commands from the remote server via the communication interface.

21. The lighting wall control of claim 20 wherein the processing circuitry is further configured to perform the one or more actions.

22. A lighting wall control comprising:
a user interface;
a voice processing module configured to process voice commands from a user;
a communication interface; and
processing circuitry coupled to the user interface, the voice processing module, and the communication interface, the processing circuitry configured to:
adjust a light output of one or more lights based on user input from the user interface and the voice commands processed by the voice processing module; and
request information from a remote server via the communication interface in response to the voice commands.

23. A lighting wall control comprising:
a user interface;
a voice processing module configured to process voice commands from a user;
a communication interface; and
processing circuitry coupled to the user interface, the voice processing module, and the communication interface, the processing circuitry configured to:

adjust a light output of one or more lights based on user input from the user interface and the voice commands processed by the voice processing module; and send a command to one or more other lighting wall controls via the communication interface based on the voice commands.

24. A lighting wall control comprising:

a user interface;

a voice processing module configured to process voice commands from a user;

a first communication interface;

a second communication interface; and processing circuitry coupled to the user interface, the voice processing module, and the first and second communication interfaces, the processing circuitry configured to:

adjust a light output of one or more lights based on user input from the user interface and the voice commands processed by the voice processing module;

transmit the voice commands to a remote server via the first communication interface;

receive one or more actions to be performed based on the voice commands from the remote server via the first communication interface; and adjust the light output of the one or more lights via the second communication interface.

* * * * *